United States Patent [19]
Jacobi et al.

[11] Patent Number: 5,379,218
[45] Date of Patent: Jan. 3, 1995

[54] METHOD AND APPARATUS FOR MINIMIZING EFFECTS OF CROSS WIND ON VEHICLE HANDLING

[75] Inventors: Stefan Jacobi, Sindelfingen; Volker Berkefeld, Renningen, both of Germany

[73] Assignee: Dr. Ing. h.c.F. Porsche AG, Weissach, Germany

[21] Appl. No.: 933,192

[22] Filed: Aug. 20, 1992

[30] Foreign Application Priority Data

Aug. 22, 1991 [DE] Germany ............... 4127725

[51] Int. Cl.6 .................... G06F 7/70; G06F 7/76
[52] U.S. Cl. .................. 364/424.01; 364/424.06; 364/426.02; 364/424.05; 296/180.1; 296/180.5; 73/182; 73/861.66
[58] Field of Search ............ 364/424.01, 424.05, 364/426.02, 426.01, 426.03, 424.06, 425, 432, 434, 558; 73/182, 861.66, 861.65; 180/903, 141, 142, 148, 143, 132, 140, 148; 296/180.1, 180.5; 340/146.3

[56] References Cited

U.S. PATENT DOCUMENTS

| 4,028,673 | 6/1977 | Taylor et al. ............ 340/146.3 |
| 4,540,059 | 9/1985 | Shibahata et al. ........... 180/141 |
| 4,613,153 | 9/1986 | Shibahata et al. ........... 280/689 |
| 4,987,542 | 1/1991 | Tran ................... 364/424.05 |
| 5,013,080 | 5/1991 | Garrone et al. ............ 296/180.1 |
| 5,119,673 | 6/1992 | Tran et al. ................. 73/182 |
| 5,267,160 | 11/1993 | Ito et al. .............. 364/424.05 |
| 5,275,475 | 1/1994 | Hartmann et al. .......... 364/426.02 |

FOREIGN PATENT DOCUMENTS 1108091 12/1961 Germany .
2331616A1 11/1975 Germany .
3816057C1 4/1989 Germany .

OTHER PUBLICATIONS

Patent Abstracts of Japan, Publication No. JP61077766, Apr. 21, 1986; Application No. JP840200946, Application Date: Sep. 25, 1984.
Patent Abstracts of Japan, Publication No. JP3253468, Nov. 12, 1991, Application No. JP900049405, Application Date: Mar. 2, 1990.

*Primary Examiner*—Thomas G. Black
*Assistant Examiner*—Jacques Harold Louis-Jacques
*Attorney, Agent, or Firm*—Evenson, McKeown, Edwards & Lenahan

[57] ABSTRACT

This invention provides an arrangement which compensates for the dynamic effects of cross winds on the steering of a vehicle. A single differential pressure sensor is connected with pressure measuring points arranged symmetrically on the forward portion of the vehicle body. The differential pressure detected by the pressure sensor is used to determine the yaw angle velocity and acceleration caused by the force of the cross wind on the vehicle body, which information is provided to a steering control element that adjusts the steering angle of the vehicle to reduce the yaw angle to approach zero.

44 Claims, 4 Drawing Sheets

▽ dpsi/dt
○ delta_h
◇ F_W

▽ dpsi/dt
○ delta_h
◇ F_W

METHOD AND APPARATUS FOR MINIMIZING EFFECTS OF CROSS WIND ON VEHICLE HANDLING

BACKGROUND AND SUMMARY OF THE INVENTION

This invention relates to a method and an apparatus to compensate for the effect of cross wind on motor vehicle handling.

When driving through a gust of cross wind, vehicles without steering correction are laterally displaced and are turned out of the wind to at least some extent. As a result, the vehicle experiences a steady-state course deviation when it emerges from the cross winds. In addition to the wind force and the direction of the wind relative to the driving direction of the vehicle, the driving speed of the vehicle and its geometry influence the extent of the lateral displacement or change of direction, which therefore differ from one vehicle to the next.

As a rule, the influence of the cross-wind on a vehicle is taken into account during its construction and is kept as low as possible by appropriate design measures. However, for physical reasons, it is not possible to eliminate completely the influence of cross winds on the vehicle handling by passive design measures alone.

It has therefore been attempted to further reduce the influence of cross winds on vehicle handling by the use of sensors to detect cross winds, with either an axle of the vehicle or the steering angle of the wheels of the axle being adjusted in a manner calculated to compensate for the effect of cross winds.

German Patent Document DE-PS 11 08 091 discloses an arrangement which operates in this manner. By way of one pressure measuring point situated respectively on each side of the vehicle, pneumatic pipes lead to chambers on both sides of a diaphragm of a pneumatic control element. The pneumatic control element actuates a hydraulic valve which controls a final control element. In a first embodiment, the final control element with a spring loaded center position displaces the suspension points of an axle of the vehicle relative to the vehicle body; in a second embodiment, it adjusts the steering angle of the wheels of this axle.

However, in this known arrangement, the effect of the pressure difference on the steering angle is predetermined and fixed in advance (largely proportional to the pressure difference), and therefore does not optimize the handling dynamics of the vehicle. Likewise, any disturbance in the approaching air has a direct effect on the steering angle.

According to the German Patent Document DE 23 31 616 A1, influences of cross wind on the vehicle handling are compensated by a steering angle which is proportional to the time derivative of the lateral acceleration of the vehicle. However, for this purpose, the lateral acceleration must be detected by a lateral acceleration sensor, which is relatively expensive, since interfering influences can be removed from its output signal only at a substantial expense. Freedom of such instruments from pulse-type interfering influences in particular is an absolute prerequisite in order to avoid the control system's carrying out uncontrolled pulse-type adjusting movements.

Finally, in German Patent Document DE 38 16 057 C1, an arrangement is disclosed for determining the influences of cross winds on a vehicle. A total of six manometric capsules are arranged on the vehicle, whose pressure values are linked to one another in an expensive manner. Such linking of the pressure values requires relatively high computing expenditures. Since absolute pressure values are required, all sensors must be connected on one side with a reference pressure chamber, which is itself connected with the atmosphere by way of a throttle line, in order to be able to use less expensive differential pressure sensors.

It is an object of the present invention to provide a method and an apparatus for minimizing the influence of cross winds on the handling of a vehicle which requires only relatively low expenditures for sensors to detect the influence of the cross wind, permits essentially free control of a steering element of the vehicle as a function of the quantity or quantities detected by the sensors, and minimizes the influence of the cross wind on the driving dynamics of vehicle.

This object is achieved according to the invention, in which a final control element adjusts an additional steering angle on an axle of the vehicle in such a manner that the yaw angle caused by the transverse force of the wind approaches zero. The additional steering angle is advantageously computed by means of a digital computer; the time response of the computed additional steering angle corresponds to a $PDT_1$-response, wherein the differential pressure is the input quantity, and the driving speed is the quantity influencing the transmission parameters.

To detect the influence of the cross wind (that is, the transverse force of the wind on the vehicle), only a single differential pressure sensor is required, which is connected with two pressure measuring points on the vehicle body by way of hoses or lines which, if possible, should have the same length. The pressure measuring points are situated symmetrically with respect to the vertically extending longitudinal plane of the vehicle, on its forward portion, for example, on the front fenders. They are placed in an area of the outer skin of the vehicle body which is free of turbulences and from which, even under unfavorable approach flow conditions, the flow does not separate.

The reaction of the final control element to cross wind is determined as a function of the vehicle's entering into or emerging from a cross wind gust, by means of different parameter sets. Driving into/out of the gust of cross wind is detected by filtering measured values of the differential pressure by means of a low-pass filter, and determining a rise or fall of the differential pressure from the differences between successive measured values of the filtered differential pressure.

The principal advantages of the invention are that it requires only relatively low expenditures for sensors to detect the influence of the cross wind; it permits essentially free control of the steering element of the vehicle as a function of the quantity or quantities detected by the sensors; and it is distinguished by the fact that optimal countermeasures are taken against the influence of the cross wind on the driving dynamics of the vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
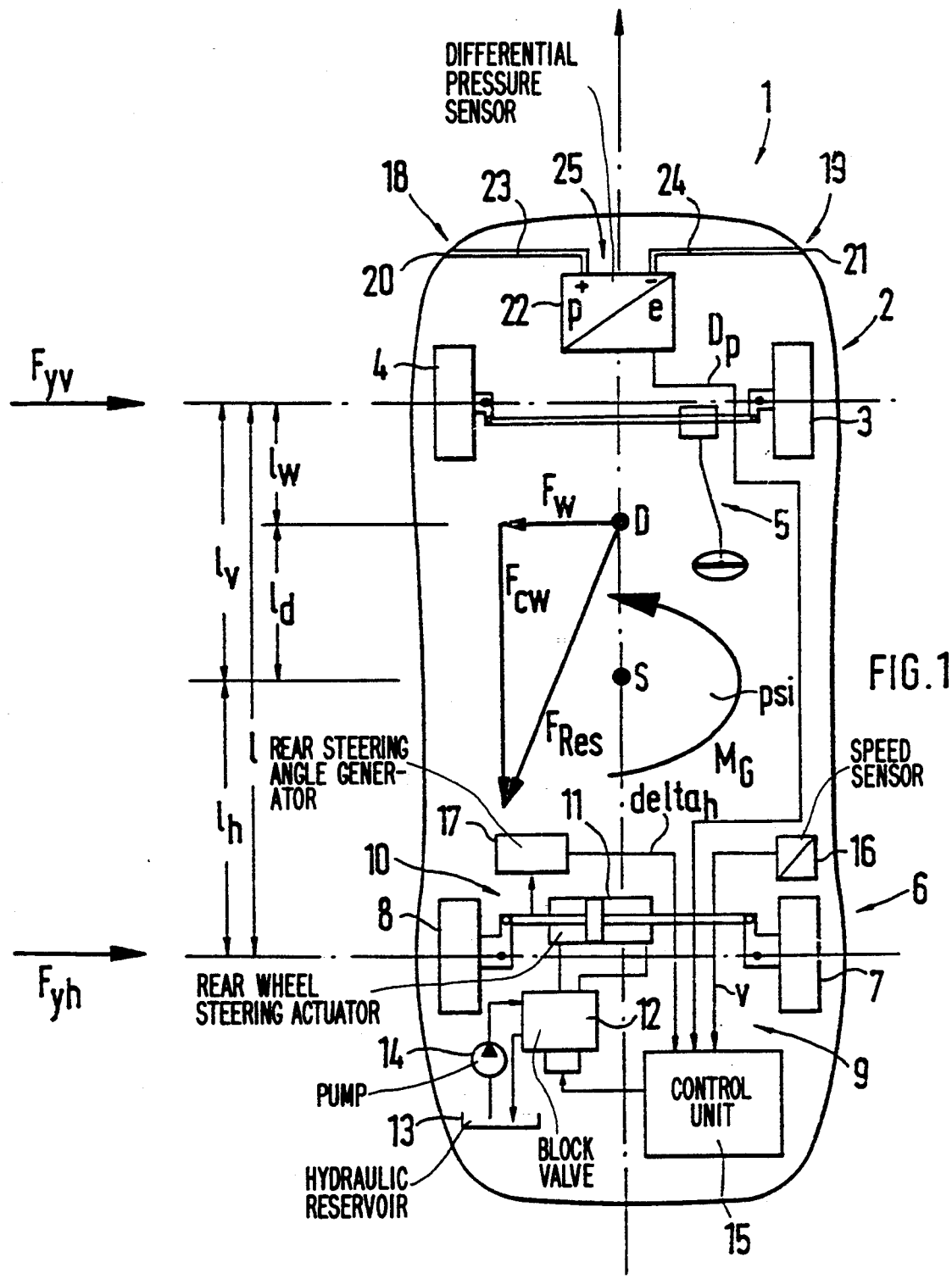
FIG. 1 is a schematic view of a vehicle which includes the cross wind compensation arrangement according to the invention.

In FIG. 1, reference number 1 indicates a two-axle vehicle whose front axle 2 or whose wheels 3, 4 can be steered arbitrarily by the vehicle driver by way of a first steering device 5. A rear axle 6 can be displaced with respect to the points of its linking to the body of the vehicle 1; the wheels 7, 8 of the rear axle can be controlled in their steering angle (rear axle steering angle $\delta_h$) as a function of operating parameters 9 of the vehicle 1 by way of a second steering arrangement 10. For this purpose, the second steering arrangement 10 is equipped with a power-operated final control element 11 for adjusting a certain rear axle steering angle $\delta_h$. In the illustrated embodiment the final control element 11 operates by means of a hydraulic power medium which is fed to the final control element 11 by an electromagnetically actuated valve block 12 or is removed by this valve block from the final control element 11 into a storage vessel 13. Finally, a pump 14 feeds hydraulic medium to the valve block 12 from the storage vessel 13.

A control unit 15, which preferably comprises a digital computer (microcomputer), controls the valve block 12 as a function of the operating parameters 9 of the vehicle 1, including among other things driving speed v of the vehicle which was sensed by means of a driving speed sensor 16. For precise adjustment of the rear axle steering angle $\delta_h$, the control unit 15 may also have a regulating cascade control circuit, for the purpose of which the rear axle steering angle $\delta_h$ is detected by way of a rear axle steering angle generator 17 and is fed to the control unit 15.

To determine the influence of cross wind on vehicle handing, pressure measuring points 18 and 19 arranged on opposite sides of the vehicle 1, measure the air pressure in the area of the outer skin of the vehicle body. Pressure measuring points 18 and 19 are designed as bores 20 and 21. A differential pressure sensor 22, which detects the differential pressure Dp between both pressure measuring points 18, 19, is arranged centrally between the measuring points and is connected with them by means of hoses or pipes 23, 24, which should have the same length, if possible.

FIG. 1 shows a transverse wind force $F_W$ acting upon a pressure point D of the vehicle 1. (Any wind force acting on the vehicle may be resolved into vector components which are parallel and perpendicular to the longitudinal axis of the vehicle.)

The transverse wind force $F_W$ points perpendicularly with respect to the longitudinal axis of the vehicle in the direction of the side of the vehicle facing away from the wind and can be calculated according to $$F_W = 0.5 * \rho * v_{Res}^2 * c_s A_f, \quad \text{(Equation 1)}$$

wherein:

$\rho$ = atmospheric density, $v_{Res}$ = approach velocity of air, $c_s$ = cross force coefficient of the aerodynamic drag of the vehicle, $A_f$ = vehicle end face.

Tests have shown that the transverse force $F_W$ of the wind is proportional to the differential pressure Dp measured by the differential pressure sensor system 25.

Figure 2:
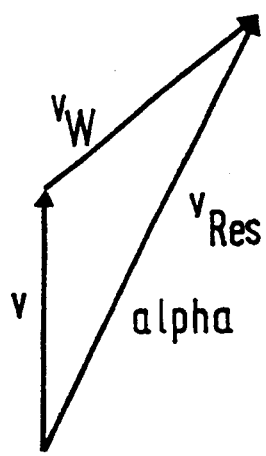
FIG. 2 is a vector diagram which shows a summation vector resulting from the wind velocity vector and the driving speed vector.

In the vector diagram according to FIG. 2, the side wind angle $\alpha$ is defined as the angle between the driving velocity vector v and the resulting summation vector $v_{Res}$ of the driving velocity vector v and the wind velocity vector $v_W$. The measured value of the transverse force $F_W$ of the wind is largely independent of the side wind angle $\alpha$. However, in order to achieve good measuring results, the differential pressure sensor system 25 comprising the differential pressure sensor 22, the pressure measuring points 18, 19, the bores 20, 21, pipes 23, 24 and the control unit 15, should be arranged according to the following directions of the vehicle 1:

The pressure measuring points 18, 19 should be arranged symmetrically with respect to the vertically extending longitudinal plane of the vehicle on its forward portion, preferably on the left and right front fender (not shown).

The pressure measuring points 18, 19 should be arranged on the vehicle 1 in such a manner that, even in the case of large side wind angles $\alpha$ between the longitudinal axis of the vehicle and the summation vector $v_{Res}$ of the driving velocity vector v and the wind velocity vector $v_W$ according to FIG. 2, they are not situated in areas of separated air flow.

The pressure sensor system should be calibrated to sense pressure fluctuations occurring on the vehicle body surface in the area of the pressure measuring points 18, 19, in a frequency range of from 0 Hz to approximately 5 Hz, so that errors due to absorption, reflection and resonance are insignificant.

In test simulations of a vehicle driving through a gust of cross wind, it was found that driving into a gust of cross wind and driving out of a gust of cross wind have different effects on the vehicle handling. Therefore, according to the invention, a computing circuit, which is connected to the differential pressure sensor and, in the present embodiment is incorporated in the control unit 15, utilize the measured differential pressure Dp to distinguish the vehicle's entry into and its emergence from a gust of cross wind, and generates a switching signal characterizing these conditions or corresponding decision conditions for further prompting.

To detect entry into or emergence from a gust of cross wind, the computing circuit in the control unit 15 filters the values of the computed transverse force $F_W$, of the wind or the detected values of the differential pressure Dp by means of a low-pass filter (filtered transverse force values $F_{Wf}$ of the wind), for example, corresponding to a $PT_1$-algorithm or by means of a correspondingly operating low-pass filter, and calculates the difference $DF_{Wf}$ between the magnitude of the filtered transverse forces of the wind determined at the present momentary point in time (computing pass k) and at the point in time of the last computation (computing pass k−1). That is:

$$DF_{Wf} = |F_{Wf,k}| - F_{Wf,k-1}|$$

The computing circuit compares the difference $DF_{Wf}$ with a transverse-wind-force-dependent threshold value $-Schw^*|F_{Wf,k-1}|$ and recognizes an entry into a gust of wind if the difference $DF_{Wf}$ of the filtered wind cross force values is larger than the transverse-wind-force-dependent threshold value: $DF_{Wf} > -Schw^*|F_{Wf,k-1}|$. Emergence from a gust of cross wind is recognized if the difference $DF_{Wf}$ of the filtered transverse-wind-force values is smaller than the transverse-wind-force-dependent threshold value: $DF_{Wf} < -Schw^*|F_{Wf,k-1}|$. The low-pass filtering of the transverse-wind-force-values $F_{Wf}$ preferably takes place by means of a cut-off frequency in the range of approximately 0.2 Hz.

By means of the transverse wind force values thus obtained, and the switching signal or the decision condition, the cross wind influence on the vehicle handling can be minimized.

For a better understanding of the effect of the cross wind on the vehicle and of the method of operation of the invention, the physical relationship between the cross wind and vehicle handling will first be explained in detail by means of FIG. 1.

The equilibrium of forces in the transverse direction of the vehicle, and the equilibrium of moments about a vertical axis of the vehicle through the center of gravity S of the vehicle 1 are formulated as the starting equations for rear wheel control. These two equations are established for the following marginal conditions: front axle steering angle $\delta_v = 0$, rear axle steering angle $\delta_h = 0$.

Forces transversely to the driving direction with the designations in FIG. 1 may be calculated as follows:

$$m^* v^* \left( \frac{d\psi}{dt} + \frac{d\beta}{dt} \right) + F_{yv} + F_{yh} - F_W, \quad \text{(Equation 2)}$$

wherein:
m = mass of the vehicle,
v = driving velocity of the vehicle,
$\Psi$ = yaw angle (rotation of the vehicle about the center of gravity S),
$d\Psi/dt$ = yaw velocity (time variation of the yaw angle),
$\beta$ = sideslip angle (angle between the longitudinal axis of the vehicle and its instantaneous direction of movement),
$d\beta/dt$ = sideslip angle velocity (time variation of the sideslip angle),
$F_{yv}$ = cross force at the first axle 2 (front axle),
$F_{yh}$ = cross force at the second axle 6 (rear axle),
$F_W$ = wind cross force.

The equation for moments about the vertical axis through the center of gravity S of the vehicle S may be established as follows:

$$M_G = J_z^* \frac{d^2\psi}{dt^2} = l_v^* F_{yv} - l_h^* F_{yh} + (l_w - l_v)^* F_W, \quad \text{(Equation 3)}$$

wherein:
$M_G$ = yawing moment about the center of gravity of the vehicle,
$J_z$ = moment of inertia of the vehicle about the vertical axis extending through the center of gravity,
$d^2\Psi/dt^2$ = yaw angle acceleration,
$l_v$ = distance of the front axle 2 from the center of gravity S,
$l_h$ = distance of the rear axle 6 from the center of gravity S,
$l_W$ = distance of the front axle 2 from the resulting wind attack point (pressure point) D.

Provided that the cross forces $F_{yv}$ and $F_{yh}$ increase linearly with the pertaining front and rear slip angles $\beta_v$ and $\beta_h$, the following applies:

$$F_{yv} = c_v^* \beta_v, \quad \text{(Equation 4)}$$

wherein:
$c_v$ slip rigidity at the first axle 2;
$\beta_v$ front slip angle (angle between the rim plane of the front wheel and the moving direction of the wheel) and $$F_{yh} = c_h^* \beta_h, \quad \text{(Equation 5)}$$

wherein:
$c_h$ slip rigidity at the rear axle 6;
$\beta_h$ rear slip angle (angle between the rim plane of the rear wheel and the moving direction of the wheel).

Provided the angles are small, the following slip angles $\beta_v$ and $\beta_h$ are obtained:

$$\beta_v = -\beta - (l_v^*(d\Psi/dt)/v). \quad \text{(Equation 6)}$$

$$\beta_h = -\beta + (l_h^*(d\Psi/dt))/v + \delta_h. \quad \text{(Equation 7)}$$

Where $\delta_h$ = the steering angle of rear wheels 7,8.

According to the invention, an additional steering angle $\delta_z$ is now applied at the rear axle 6 in such a manner that the yaw angle change caused by the wind cross force $F_W$ (yaw angle velocity $d\Psi/dt$ and yaw angle acceleration $$\frac{d^2\psi}{dt^2}$$

of the vehicle approaches zero $$\left( \frac{d\psi}{dt} \to 0, \quad \frac{d^2\psi}{dt^2} \to 0 \right).$$

Since at the rear axle 6 no additional steering angle is to be applied, and in particular, the rear axle 6 is not influenced by the driver, the rear axle steering angle adjusted by means of the final control element corresponds to the additional steering angle: $\delta_h = \delta_z$.

Simplification of the above equations yields a differential equation which contains as the time-variable quantities only the wind cross force $F_W$ and the rear axle steering angle $\delta_h$:

$$\delta_h + T_{l,g}*v*\left(\frac{d\delta_h}{dt}\right) = V_g*\left(F_W + T_{D,g}*v*\left(\frac{df_w}{dt}\right)\right), \quad \text{(Equation 8)}$$

wherein:

$$\frac{d\delta_h}{dt} =$$

rear axle steering angle speed (time derivative of the rear axle steering angle $\delta_h$), with the coefficients:

$$T_{l,g} = \frac{m*l_h}{c_v*l}$$

$$T_{D,g} = \frac{m*(l_w - l_v)}{c_v* l_w + c_h*(l_w - l)}$$

$$v_g = \frac{C_v*l_w + c_h*(l_w - l)}{c_v*c_h*l}$$

wherein:
l = wheelbase.

From this equation, the required adjustment to the rear axle steering angle $\delta_h$ can be determined. Since the control unit 15 preferably is a digital computer, which must have an acceptable computing capacity for reasons of expenditures and cost, the adjustment to the rear axle steering angle $\delta_h$ is determined numerically by means of the digital computer, for the purpose of which the differential quotients for the rear axle angle $d\delta_h/dt$ and $Df_W/dt$ are replaced by the difference quotients $$\frac{D\delta_{h,k}}{Dt} = \frac{(\delta_{h,k} - \delta_{h,k-1})}{Dt}, \quad \text{(Equation 9)}$$

wherein:

$$\frac{D\delta_{h,k}}{Dt} =$$

difference quotient of the rear axle steering angle in the case of the momentary (k-th) computing step,
Dt = time increment when computing the difference quotient (time between two iteration steps),
$\delta_{h,k}$ = rear axle steering angle at the point in time of the momentary (k-th) computing step,
$(\delta_{h,k-1}$ = rear axle steering angle at the point in time of the last computation, (k−1)-th computing step,
and $$\frac{DF_{W,k}}{Dt} = \frac{(F_{W,k} - F_{W,k-1})}{Dt}, \quad \text{(Equation 10)}$$

wherein:
$DF_{Wk}$ = difference quotient of the transverse wind force at the point in time of the momentary (k-th) computing step,
$F_{Wk}$ = transverse wind force at the point in time of the momentary (k-th) computing step,
$F_{W,k-1}$ = transverse wind force at the point in time of the last computation.

The rear axle steering angle $\delta_h$, which now is to be adjusted by the control unit 15, is obtained in the k-th computing pass at the time interval Dt (computing time or program run time) as follows:

$$\delta_{h,k} = \frac{T_{l,g}*v*\delta_{h,k-1} + V_g*(F_{W,k}*Dt + T_{D,g}*v*(F_{W,k} - F_{W,k-1}))}{T_{l,g}*v + Dt} \quad \text{(Equation 11)}$$

wherein:
$T_{l,g}$, $T_{D,g}$, and $V_g$ = coefficients, see Equation 8,
$\delta_{h,k}$ = rear axle steering angle at the point in time of the momentary (k-th) computing step,
$\delta_{h,k-1}$ = rear axle steering angle at the point in time of the previous computation,
$F_{W,k}$ = transverse wind force at the point in time of the momentary (k-th) computing step,
$F_{W,k-1}$ = transverse wind force at the point in time of the previous (k−1)-th computation,
v = driving speed at the momentary point in time.

However, this equation applies only to a linear model, and when the vehicle is hit by the cross wind along its whole length.

Simulation computations with respect to the dynamics of vehicle movement illustrate that the disturbance caused by a cross wind impulse, because of non-linearities, must be controlled differently in the case of an increasing cross wind than in the case of a decreasing cross wind. In addition, when driving through a wind gust, the approach flow to the vehicle is highly transient for a short time.

These conditions must therefore be recognized and compensated for by means of different rear axle steering angle adjustments. For this purpose, the rear axle steering angles to be adjusted, by means of Equation 11 (above) or 12 (below), are computed according to which of the above mentioned conditions exists (that is, increasing or decreasing cross wind), by means of different sets of parameters: $T_{l,g,in}$, $T_{D,g,in}$ or $T_{l,g,out}$, $T_{D,g,out}$.

The reaction of the axle steering angle to a transverse wind force simulation described by a $PDT_1$-course, at a high driving speed, and with the vehicle specific constants that are valid here, will be concluded within no more than 2 seconds. During this time, the parameter set that was loaded at the start of the simulation must remain in effect in the computing algorithm.

To detect a vehicle's entry into and emergence from a cross wind gust, the values of the computed transverse wind force $F_{W,k}$ or the detected values of the differential pressure Dp, as described above, are filtered by means of a low-pass filter (filtered transverse wind force values $F_{Wf,k}$), and the difference between the filtered transverse wind force values $|F_{Wf,k}|, |F_{Wf,k-1}|$ determined at the momentary point in time (computing step k) and at the point in time of the last computation (computing step k−1) is calculated and compared with a transverse-wind-force-dependent threshold value—Schw*$|F_{Wf,k-1}|$. Entry into the cross wind gust will be recognized if the difference $DF_{Wf} = |F_{Wf,k}| - |F_{Wf,k-1}|$ is larger than the wind-transverse-force-dependent threshold value: $DF_{Wf} > -\text{Schw}*|F_{Wf,-1}|$. Emergence from the transverse wind gust is recognized if the difference $DF_{Wf} = |F_{Wf,k}| - F_{Wf,k-1}|$ of the filtered transverse wind force values is smaller than the transverse-wind-force-dependent threshold value: $DF_{Wf} < -\text{Schw}*|F_{Wf,k-1}|$.

Figure 3:
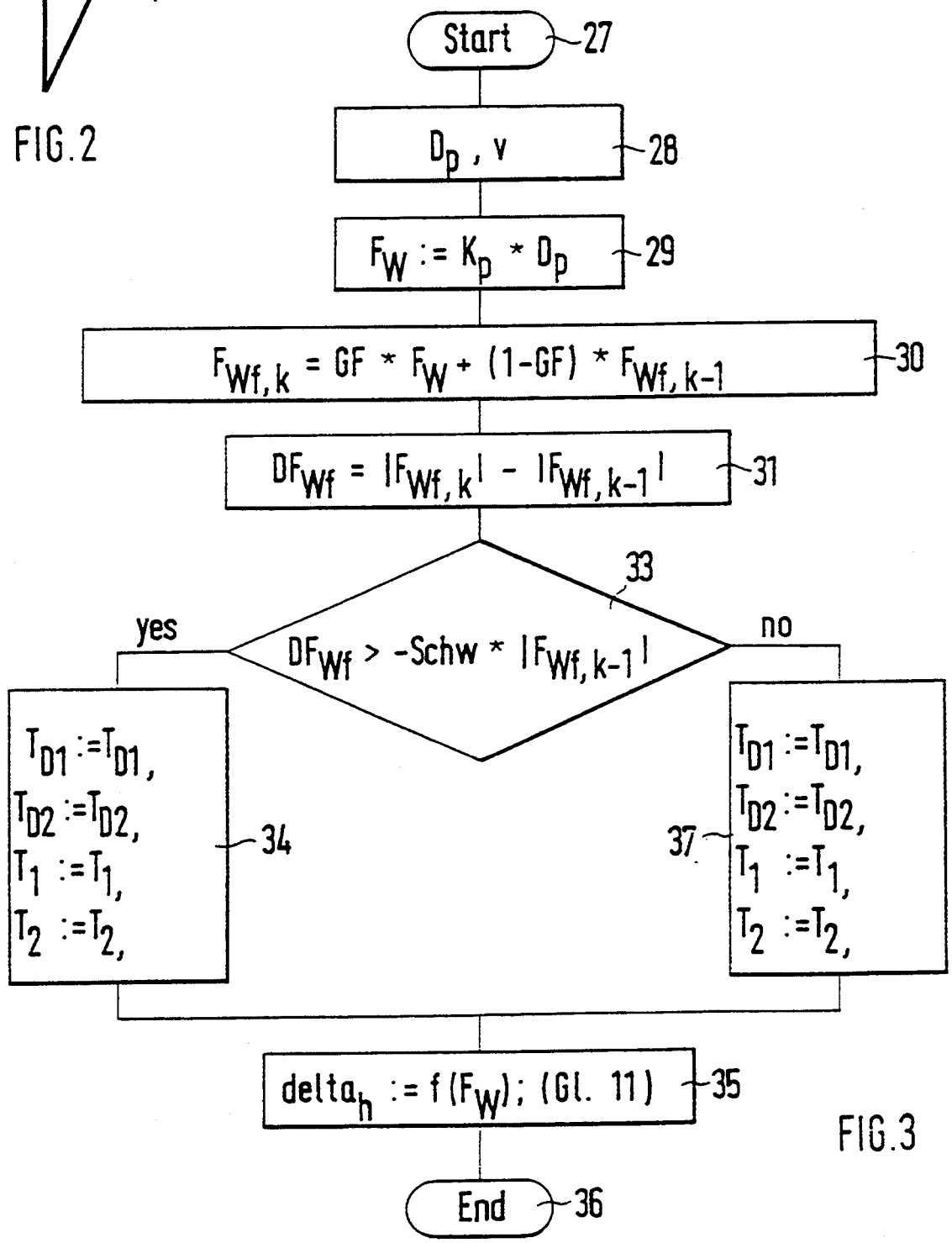
FIG. 3 is a flow chart for determining a rear axle steering angle which minimizes the influence of a cross wind on the vehicle.

FIG. 3 is a logic flow chart for determining the rear axle steering angle. On the basis of this flow chart, a corresponding subroutine may be established and may be included, for example, in a control program for a rear axle steering.

After the program start, 27, the input values differential pressure Dp and driving speed v are first determined, 28. After the determination of the transverse wind force $F_W$ from the differential pressure Dp and a proportion constant $K_p$, 29, the transverse wind force values $F_W$, by means of a $PT_1$-algorithm, are smoothed exponentially by a smoothing constant GF, 30, and the difference $DF_{Wf}$ is calculated, 31.

It is then determined whether the difference of the transverse-wind force values $DF_{Wf}$ is larger than the transverse-wind-force-dependent threshold value $-Schw^*|F_{Wf,k-1}|$, 33. If so, the parameters for the determination of Equation 11 are set to those for driving into a cross wind gust ($T_{D,g}:=T_{D,g,in}$; $T_{l,g}:=T_{l,g,in}$), the rear axle angle is determined 35 according to Equation 11, and the program is terminated, 36.

If condition 33 is not met, the parameters for determination of the rear axle steering angle $\delta_h$ are set to those for emergence of the vehicle out of a cross wind gust (($T_{D,g}:=T_{D,g,out}$; $T_{l,g}:=T_{l,g,out}$), and the continuation takes place by means of program step 35.

The exponential smoothing factor GF and the threshold factor Schw are selected such that the respective other parameter set is not loaded before there is a significant transverse-wind force change which is larger than the one caused by high-frequency turbulences in wind gusts. The exponential smoothing factor GF determines the low-pass filter limit frequency $f_0$ and is calculated as follows:

$$GF = 1 - e^{(-2\pi^* f_o^* DT)} \quad \text{(Equation 12)}$$

wherein DT is the time interval between the (k−1)-th and the k-th computing step.

Figure 4:
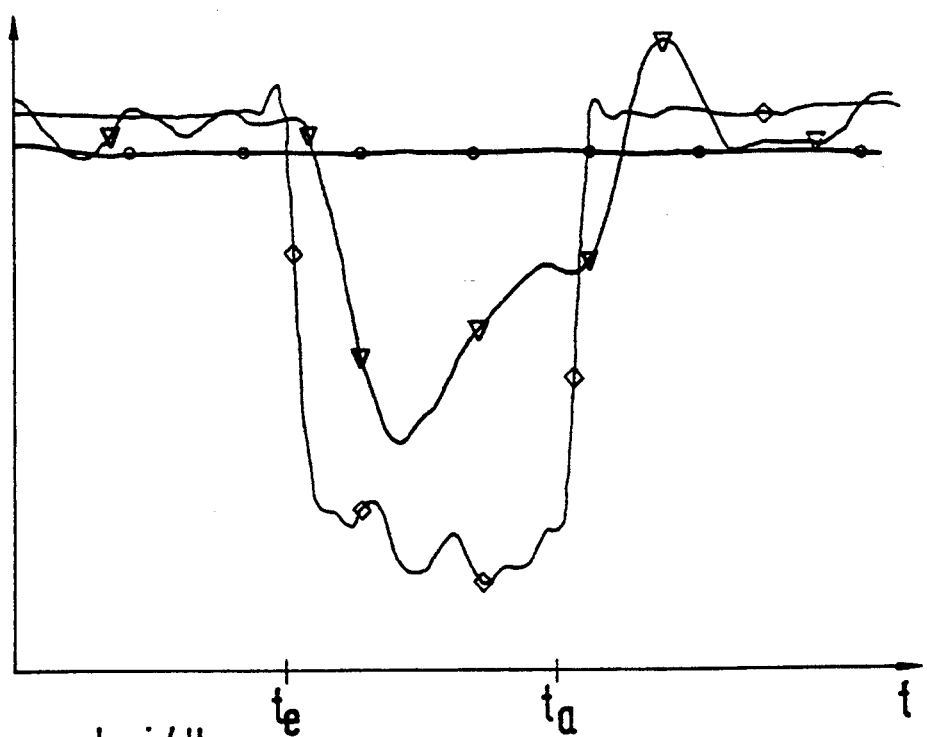
FIG. 4 is a time diagram of an operating parameter of the vehicle when driving through a cross wind gust without any control of the rear axle steering angle.

FIG. 4 illustrates the time dependence of the yaw velocity $d\Psi/dt$ and the transverse-wind force $F_W$ determined from the pressure difference Dp when the rear axle steering angle $\delta_h$ is uncontrolled when driving through a cross wind gust 42. In this case, the vehicle drives through the cross wind gust 42 between the points in time $t_e$ and $t_a$. As indicated in the diagram, the yaw velocity $$\frac{d\psi}{dt},$$

after entry into the transverse wind gust 42 dies out with a relatively high amplitude in one direction, and during emergence overshoots in the opposite direction with a certain delay.

Figure 5:
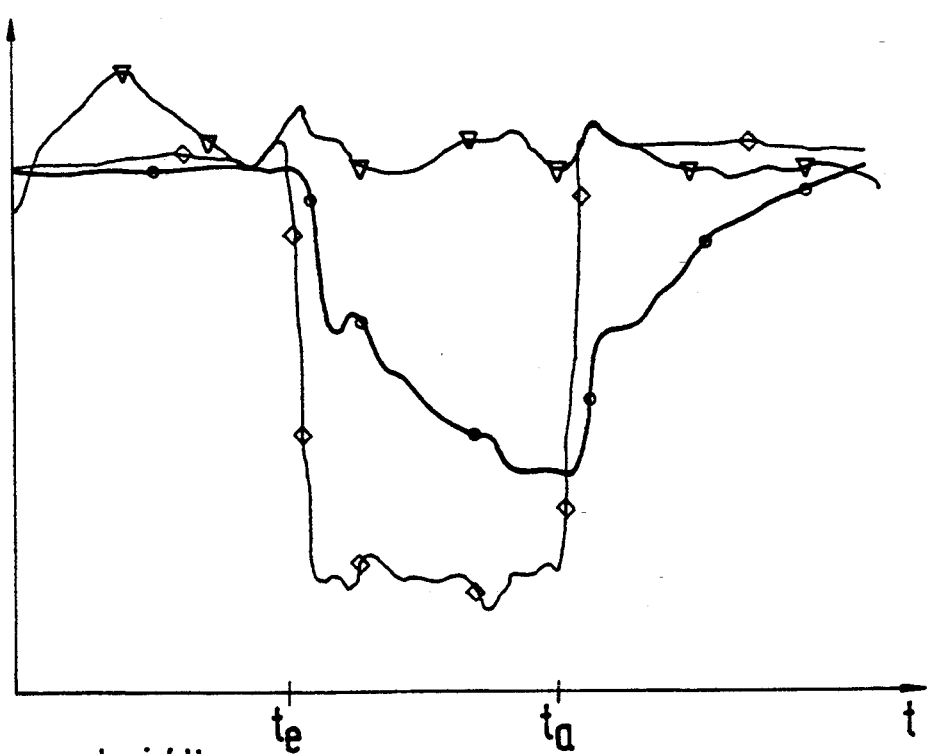
FIG. 5 is a diagram according to FIG. 4 but with control of the rear axle steering angle which is a function of the force of the cross wind.

If, on the other hand, the rear axle steering angle $\delta_h$ is controlled according to this method, the yaw velocity $$\frac{d\psi}{dt},$$

when driving through the cross wind gust 42, remains almost at zero, as indicated in FIG. 5. In this case, the rear axle steering angle $\delta_h$ is controlled such that it follows the abruptly changing wind cross force values corresponding to the course of a $PDT_1$-element. As indicated in FIG. 5, the vehicle is very steady with respect to the yaw velocity when the rear axle steering angle $\delta_h$ is controlled.

The measured quantities illustrated in FIGS. 4 and 5 are filtered through a low-pass filter with a critical frequency in the range of 5 Hz.

Figure 6:
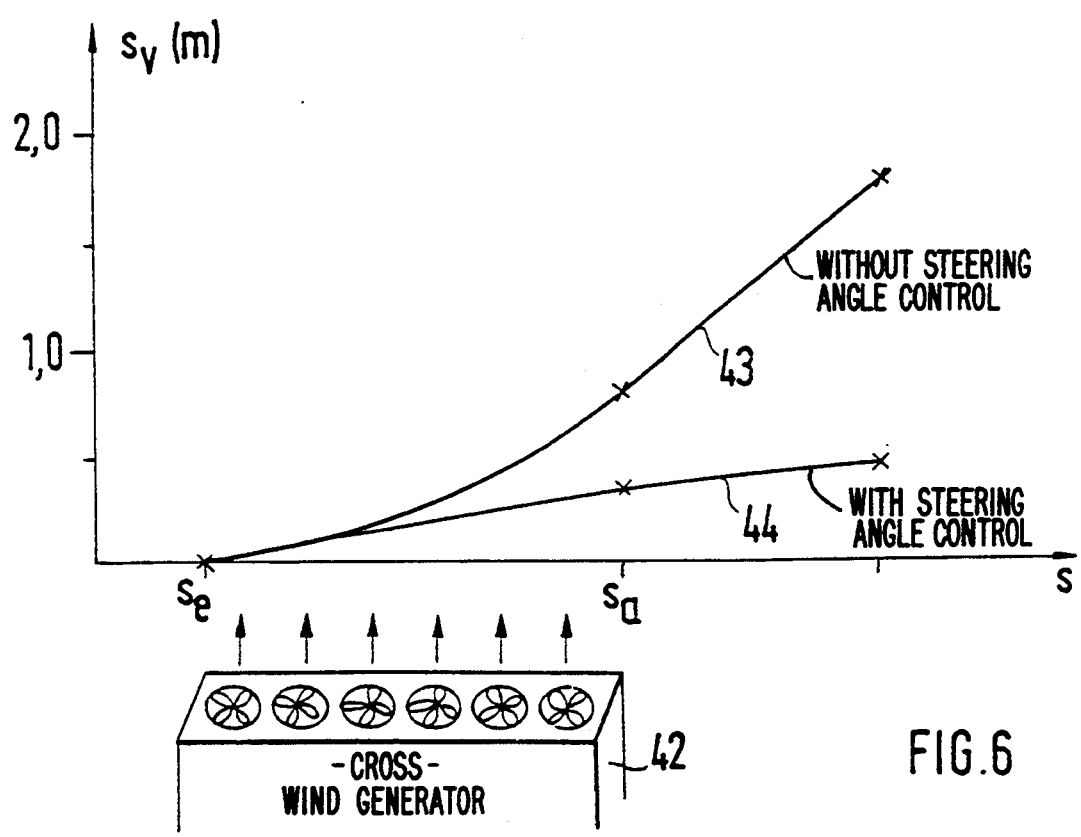
FIG. 6 is a diagram of the lateral displacement of a vehicle when driving through a gust of cross wind, with and without controlling the rear axle steering angle.

The effects of the controlling the rear axle steering angle become even clearer when the lateral displacement $s_y$ is entered above the driving course s, as shown in FIG. 6. In this case, the vehicle drives into the cross wind gust 42 at path label $s_e$, and drives out of it at path label $s_a$. Without any control of the rear axle steering angle $\delta_h$, the vehicle describes the path course 43, with an easily recognizable lateral displacement $s_y$.

In contrast, with vehicle control according to the above-described method, the vehicle will drive on path course 44, whereby directly at the end of the cross wind gust and particularly because of the slighter course deviation of the vehicle when driving through the cross wind gust, a clearly smaller course deviation is obtained and therefore also a significantly smaller lateral displacement $s_y$.

A control according to the above-mentioned method may also be used without limitation at the front axle 2. For this purpose, the final control element 11 must be changed so that it acts on the front axle 2 and superimposes on the front axle steering angle $\delta_v$ adjusted by the driver the additional steering angle $\delta_z$ so that an overall steering angle $\delta_{gv} = \delta_v + \delta_z$ is adjusted at the front axle 2.

The marginal conditions will now be as follows: front axle steering angle $\delta_v \neq 0$ and rear axle steering angle $\delta_h = 0$.

As a result, Equations 6 and 7 will be as follows:

$$\beta_v = -\beta - \left( l_v^* \frac{(d\psi)}{dt} / v \right) + \delta_h. \quad \text{(Equation 13)}$$

$$\beta_h = -\beta + \left( l_h^* \frac{(d\psi)}{dt} / v \right). \quad \text{(Equation 14)}$$

and the coefficients in Equation 8 are calculated as follows:

$$T_{l,g} = \frac{m^* l_v}{c_h^* l},$$

$$T_{D,g} = \frac{m^*(l_w - l_v)}{c_v^* l_w + c_h^*(l_w - l)},$$

$$V_g = \frac{-c_v^* l_w + c_h^*(l - l_w)}{c_v^* c_h^* l},$$

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for minimizing effects of cross wind on the handling of a vehicle having a vehicle body, at least two axles, means for driver steering of the vehicle, air pressure measuring points arranged on opposite sides of an outer skin of the vehicle body, a final control element which responds to a differential between pressures measured at the pressure measuring points on both vehicle sides, and means for generating vehicle steering movements which are directed against the effects of the cross wind, said method comprising the steps of:
determining differential pressure between the pressures measured at said pressure measuring points;
using said differential pressure to determine a yaw angle velocity and yaw angle acceleration of said vehicle caused by force of said cross wind on said vehicle body; and causing said final control element to apply an additional steering angle adjustment to said vehicle to cause said yaw angle velocity and yaw angle acceleration to approach zero.

2. A method according to claim 1, wherein the additional steering angle to be adjusted is determined by solving a differential equation of a single-track linear model of dynamics of vehicle movement resulting from a motion equation of the vehicle about a vertical axis extending through a center of gravity of the vehicle, the yaw angle velocity and yaw angle acceleration being equal to zero, and transverse wind force being proportional to the differential pressure.

3. A method according to claim 2, wherein the additional steering angle is determined numerically, by means of a digital computer, in k-th computing pass in a time interval Dt, according to the formula:

$$\delta_{z,k} = \frac{T_{l,g}*v*\delta_{z,k-1} + V_g*(F_{W,k}*Dt + T_{D,g}*v*(F_{W,k} - F_{W,k-1}))}{T_{l,g}*v + Dt}$$

wherein:
$T_{l,g}$, $T_{D,g}$ and $V_g$ = proportion constants,
$\delta_{z,k}$ = additional steering angle at a momentary point in time,
$\delta_{z,k-1}$ = additional steering angle at a point in time of an immediately preceding computation,
$F_{W,k}$ = transverse wind force at the momentary point in time,
$F_{W,k-1}$ = transverse wind force at the point at time of the immediately preceding computation,
v = driving speed at the momentary point in time,
Dt = time interval between iteration steps.

4. A method according to claim 2, wherein the pressure measuring points are arranged symmetrically to a perpendicularly extending longitudinal plane of the vehicle, on its forward portion.

5. A method according to claim 2, wherein the pressure measuring points comprise bores in the outer skin of the vehicle body, said differential pressure sensor being arranged centrally between the two pressure measuring points and being connected with the two bores by way of lines which have substantially the same length.

6. A method according to claim 1, wherein the additional steering angle is determined numerically, by means of a digital computer, in a k-th computing pass in a time interval Dt, according to the formula:

$$\delta_{z,k} = \frac{T_{l,g}*v*\delta_{z,k-1} + V_g*(F_{W,k}*Dt + T_{D,g}*v*(F_{W,k} - F_{W,k-1}))}{T_{l,g}*v + Dt}$$

wherein:
$T_{l,g}$, $T_{D,g}$ and $V_g$ = proportion constants,
$\delta_{z,k}$ = additional steering angle at a momentary point in time,
$\delta_{z,k-1}$ = additional steering angle at a point in time of an immediately preceding computation,
$F_{W,k}$ = transverse wind force at the momentary point in time,
$F_{W,k-1}$ = transverse wind force at the point at time of the immediately preceding computation,
v = driving speed at the momentary point in time,
Dt = time interval between iteration steps.

7. A method according to claim 6, wherein the vehicle's entry into and emergence from a cross wind gust are detected from values of the measured differential pressure, and the additional steering angle is computed by means of different parameter sets, depending on whether the vehicle is entering or emerging from said cross wind gust.

8. A method according to claim 7, wherein computation of the additional steering angle by means of the same parameter set is continued as long as the additional steering angle is shifted as a reaction to an immediately preceding change of the transverse wind force or as long as no significant change of the wind cross force has occurred.

9. A method according to claim 8, wherein the vehicle's entry into or emergence from a cross is detected by the following steps:
using a low pass filter to filter at least one of: computed values of transverse wind force and detected value of differential pressure;
deriving a difference between filtered transverse wind force values determined at a particular point in time and at a point in time of an immediately preceding measurement of transverse wind force;
comparing said difference with a transverse wind force dependent threshold value;
recognizing an entry of the vehicle into a cross wind gust if the filtered transverse wind force value determined for said particular point in time is larger than the filtered transverse wind force value determined for said immediately preceding point in time; and
recognizing an emergence of the vehicle from a cross wind gust if the filtered transverse wind if the filtered transverse wind force value determined for said particular point in time is smaller than the filtered transverse wind force value determined for said immediately preceding point in time.

10. A method according to claim 9, wherein the filtering of the transverse wind force values takes place by means of a low-pass filter with a critical frequency in the range of 0.2 Hz.

11. A method according to claim 7, wherein the vehicle's entry into or emergence from a cross is detected by the following steps:
using a low pass filter to filter at least one of: computed values of transverse wind force and detected value of differential pressure;
deriving a difference between filtered transverse wind force values determined at a particular point in time and at a point in time of an immediately preceding measurement of transverse wind force;
comparing said difference with a transverse wind force dependent threshold value;
recognizing an entry of the vehicle into a cross wind gust if the filtered transverse wind force value determined for said particular point in time is larger than the filtered transverse wind force value determined for said immediately preceding point in time; and
recognizing an emergence of the vehicle from a cross wind gust if the filtered transverse wind force value determined for said particular point in time is smaller than the filtered transverse wind force value determined for said immediately preceding point in time.

12. A method according to claim 11, wherein the filtering of the transverse wind force values takes place by means of a low-pass filter with a critical frequency in the range of 0.2 Hz.

13. A method according to claim 11, wherein the pressure measuring points are arranged symmetrically to a perpendicularly extending longitudinal plane of the vehicle, on its forward portion.

14. A method according to claim 11, wherein the pressure measuring points comprise bores in the outer skin of the vehicle body, said differential pressure sensor being arranged centrally between the two pressure measuring points and being connected with the two bores by way lines which have substantially the same length.

15. A method according to claim 7, wherein the pressure measuring points are arranged symmetrically to a perpendicularly extending longitudinal plane of the vehicle, on its forward portion.

16. A method according to claim 7, wherein the pressure measuring points comprise bores in the outer skin of the vehicle body, said differential pressure sensor being arranged centrally between the two pressure measuring points and being connected with the two bores by way of lines which have substantially the same length.

17. A method according to claim 1, wherein the pressure measuring points are arranged symmetrically to a perpendicularly extending longitudinal plane of the vehicle, on its forward portion.

18. A method according to claim 17, wherein the pressure measuring points are arranged on left and right front fenders of said vehicle.

19. A method according to claim 18, wherein the pressure measuring points are arranged where they are not in areas of separated air flow, even in the case of large angles between a longitudinal axis of the vehicle and a summation vector of a driving speed vector and a wind velocity vector.

20. A method according to claim 17, wherein the pressure measuring points are arranged where they are not in areas of separated air flow, even in the case of large angles between a longitudinal axis of the vehicle and a summation vector of a driving speed vector and a wind velocity vector.

21. A method according to claim 1, wherein the pressure measuring points comprise bores in the outer skin of the vehicle body, said differential pressure sensor being arranged centrally between the two pressure measuring points and being connected with the two bores by way of lines which have substantially the same length.

22. A method according to claim 21, wherein said differential pressure sensor is calibrated to measure pressure fluctuations on the vehicle body surface in a frequency range of from 0 Hertz to approximately 5 Hertz, whereby errors due to absorption, reflection and resonances are minimized.

23. A method according to claim 21, wherein a signal taken from the differential pressure sensor 22 and representing the differential pressure is converted into a transverse force acting upon the vehicle and resulting from the cross wind, by way of vehicle-type-dependent and pressure-bore-position-dependent correction values.

24. An arrangement for minimizing effects of cross wind on the handling of a vehicle having a vehicle body, at least two axles, means for driver steering of the vehicle, air pressure measuring points arranged on an outer skin of the vehicle body, a final control element which responds to a differential between pressures measured at the pressure measuring points on both vehicle sides, and means for generating vehicle steering angle adjustments which are directed against the effects of the cross wind, said arrangement comprising:

a differential pressure sensor responsive to pressures measured at said measuring points; and a control unit means responsive to differential pressure measured by said differential pressure sensor for determining a yaw angle velocity and a yaw angle acceleration of said vehicle caused by force of said cross wind on said vehicle body;

said control unit means also comprising means for causing said final control element to apply an adjustment to a steering angle of said vehicle to cause said yaw angle velocity and yaw angle acceleration to approach zero.

25. Arrangement according to claim 24, wherein said adjustment is applied to a rear axle of said vehicle.

26. An arrangement according to claim 24, wherein the control unit comprises a digital computer which determines said steering angle adjustment according to the following formula:

$$\delta_{z,k} = \frac{T_{I,g}{}^*v^*\delta_{z,k-1} + V_g{}^*(F_{W,k}{}^*Dt + T_{D,g}{}^*v^*(F_{W,k} - F_{W,k-1}))}{T_{I,g}{}^*v + Dt}$$

wherein:

$T_{I,g}$, $T_{D,g}$ and $V_g$ = proportion constants, $\delta_{z,k}$ = additional steering angle at a momentary point in time, $\delta_{z,k-1}$ = additional steering angle at a point in time of an immediately preceding computation, $F_{W,k}$ = transverse wind force at the momentary point in time, $F_{W,k-1}$ = transverse wind force at the point in time of the last computation, v = driving speed at the momentary point in time, Dt = time interval between iteration steps.

27. An arrangement according to claim 26, wherein the control unit 15 detects, the vehicle's entry into and emergence from a cross wind gust, from the values of the measured differential pressure, and computes the steering angle adjustment by means of different parameter sets, depending on whether the vehicle is entering or emerging from said cross wind gust.

28. An arrangement according to claim 27, wherein the control unit continues to compute the additional steering angle by means of the same parameter set as long as it shifts the additional steering angle to be adjusted as a reaction to an immediately preceding change of the transverse wind force or as long as no significant change of the transverse wind force has yet occurred.

29. An arrangement according to claim 28, wherein said control unit means comprises:

a low pass filter for filtering at least one of: computed values of transverse wind force, and detected values of differential pressure;

means for deriving a difference between filtered transverse wind force values determined at a particular point in time and at a point in time of an immediately preceding measurement of transverse wind force;

means for comparing said difference with a transverse wind force dependent threshold value;

means for recognizing an entry of the vehicle into a cross wind gust if the filtered transverse wind force value determined for said particular point in time is larger than the filtered transverse wind force value determined for said immediately preceding point in time; and means for recognizing an emergence of the vehicle from a cross wind gust if the filtered transverse wind force value determined for said particular point in time is smaller than the filtered transverse wind force value determined for said immediately preceding point in time.

30. An arrangement according to claim 29, wherein said low pass filter has a critical frequency in the range of 0.2 Hz.

31. An arrangement according to claim 27, wherein said control unit means 15 comprises:

a low pass filter for filtering at least one of: computed values of transverse wind force, and detected values of differential pressure;

means for deriving a difference between filtered transverse wind force values determined at a particular point in time and at a point in time of an immediately preceding measurement of transverse wind force;

means for comparing said difference with a transverse wind force dependent threshold value;

means for recognizing an entry of the vehicle into a cross wind gust if the filtered transverse wind force value determined for said particular point in time is larger than the filtered transverse wind force value determined for said immediately preceding point in time; and means for recognizing an emergence of the vehicle from a cross wind gust if the filtered transverse wind force value determined for said particular point in time is smaller than the filtered transverse wind force value determined for said immediately preceding point in time.

32. An arrangement according to claim 31, wherein said low pass filter has a critical frequency in the range of 0.2 Hz.

33. An arrangement according to claim 31, wherein the pressure measuring points are arranged symmetrically to a perpendicularly extending longitudinal plane of the vehicle on its forward portion.

34. An arrangement according to claim 27, wherein the pressure measuring points are arranged symmetrically to a perpendicularly extending longitudinal plane of the vehicle on its forward portion.

35. An arrangement according to claim 27, wherein the pressure measuring points comprise as bores in the outer skin of the vehicle body, said differential pressure sensor being arranged centrally between both pressure measuring points and being connected with the two bores by way of lines which have substantially the same length.

36. An arrangement according to claim 26, wherein the pressure measuring points are arranged symmetrically to a perpendicularly extending longitudinal plane of the vehicle on its forward portion.

37. An arrangement according to claim 26, wherein the pressure measuring points comprise as bores in the outer skin of the vehicle body, said differential pressure sensor being arranged centrally between both pressure measuring points and being connected with the two bores by way of lines which have substantially the same length.

38. An arrangement according to claim 24, wherein the pressure measuring points are arranged symmetrically to a perpendicularly extending longitudinal plane of the vehicle on its forward portion.

39. An arrangement according to claim 38, wherein the pressure measuring points are arranged on left and right front fenders of said vehicle.

40. An arrangement according to claim 39, wherein the pressure measuring points are arranged where they are not in areas of separated air flow, even in the case of large angles between a longitudinal axis of the vehicle and of a summation vector of a driving speed vector and a wind velocity vector.

41. An arrangement according to claim 38, wherein the pressure measuring points are arranged where they are not in areas of separated air flow, even in the case of large angles between a longitudinal axis of the vehicle and of a summation vector of a driving speed vector and a wind velocity vector.

42. An arrangement according to claim 24, wherein the pressure measuring points comprise as bores in the outer skin of the vehicle body, said differential pressure sensor being arranged centrally between both pressure measuring points and being connected with the two bores by way of lines which have substantially the same length.

43. An arrangement according to claim 42, wherein said differential pressure sensor is calibrated to measure pressure fluctuations in a frequency range of from 0 Hertz to approximately 5 Hertz occurring on the vehicle body surface, whereby errors due to absorption, reflection and resonances are minimized.

44. An arrangement according to claims 43, wherein a signal taken from the differential pressure sensor and representing the differential pressure is converted into a cross force acting upon the vehicle and resulting from the cross wind, by way of vehicle-type-dependent and pressure-bore-position-dependent correction values.

* * * * *